Figure 2:
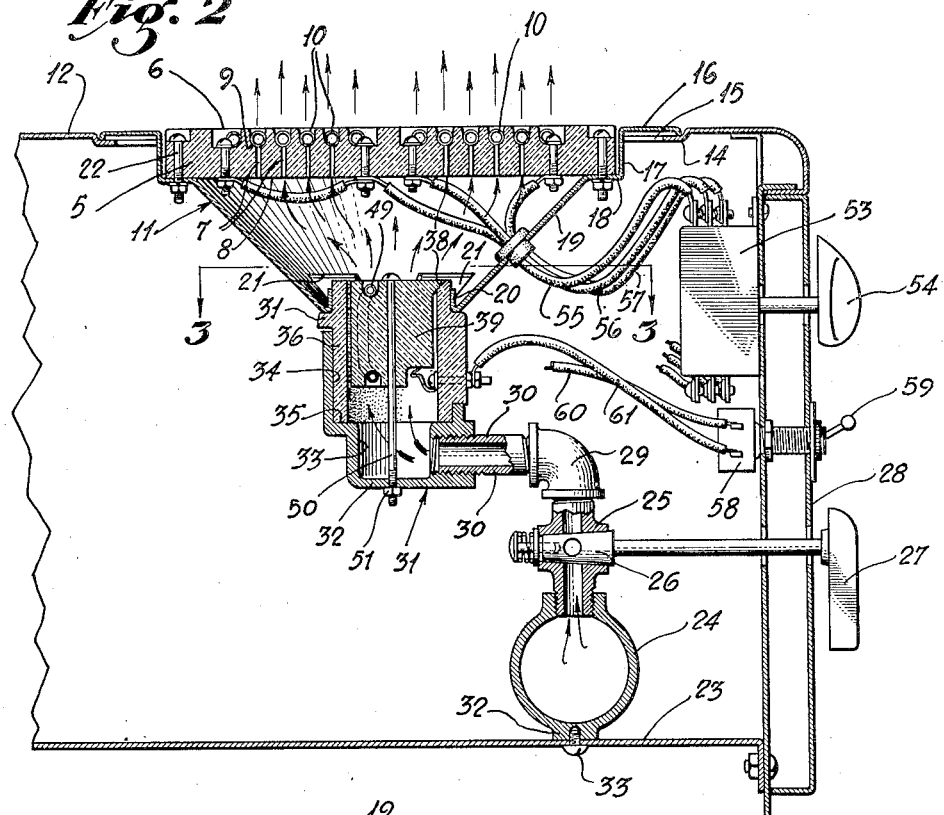

April 29, 1941.  C. GENDA  2,239,957
STOVE
Filed May 7, 1938   3 Sheets-Sheet 1
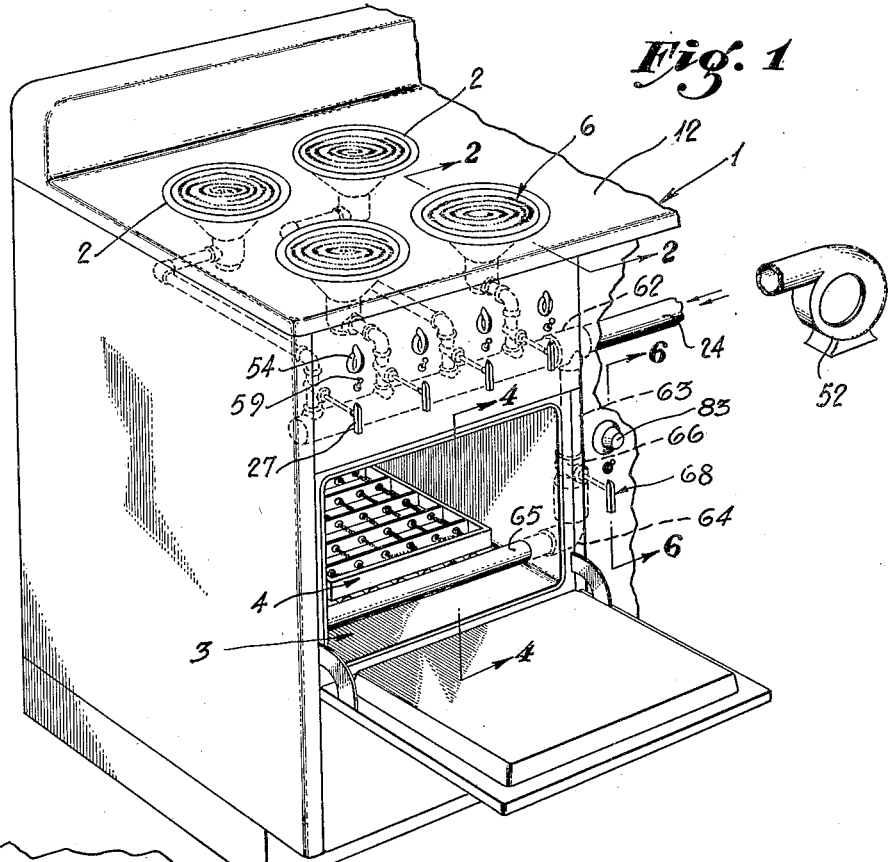
*Fig. 1*
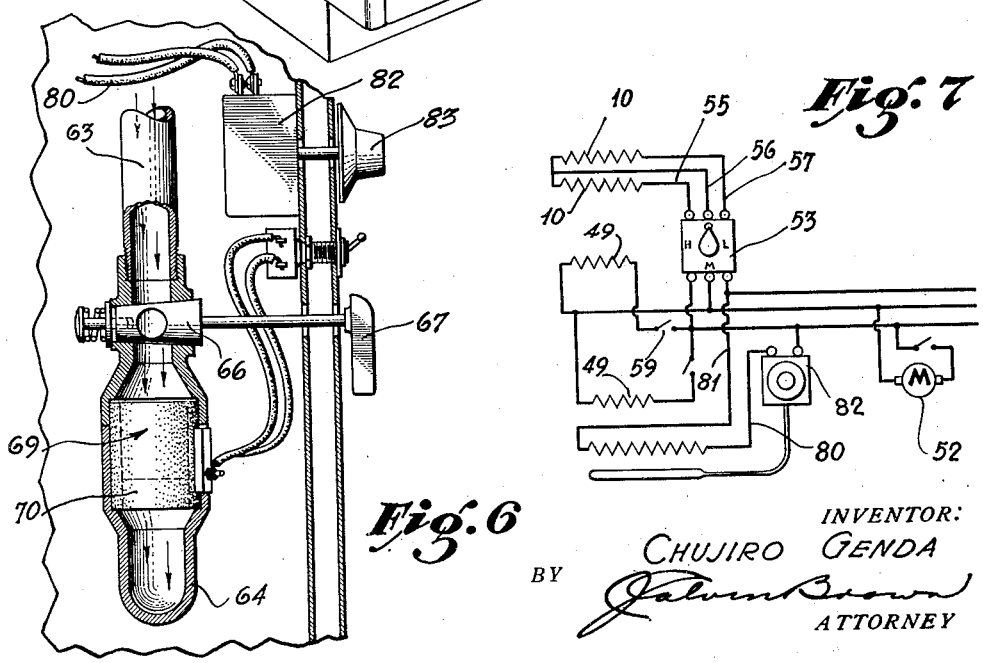
*Fig. 6*   *Fig. 7*
INVENTOR:
CHUJIRO GENDA
BY Galvin Brown
ATTORNEY April 29, 1941. C. GENDA 2,239,957
STOVE
Filed May 7, 1938 3 Sheets-Sheet 2

INVENTOR,
CHUJIRO GENDA
BY
*Calvin Brown*
ATTORNEY

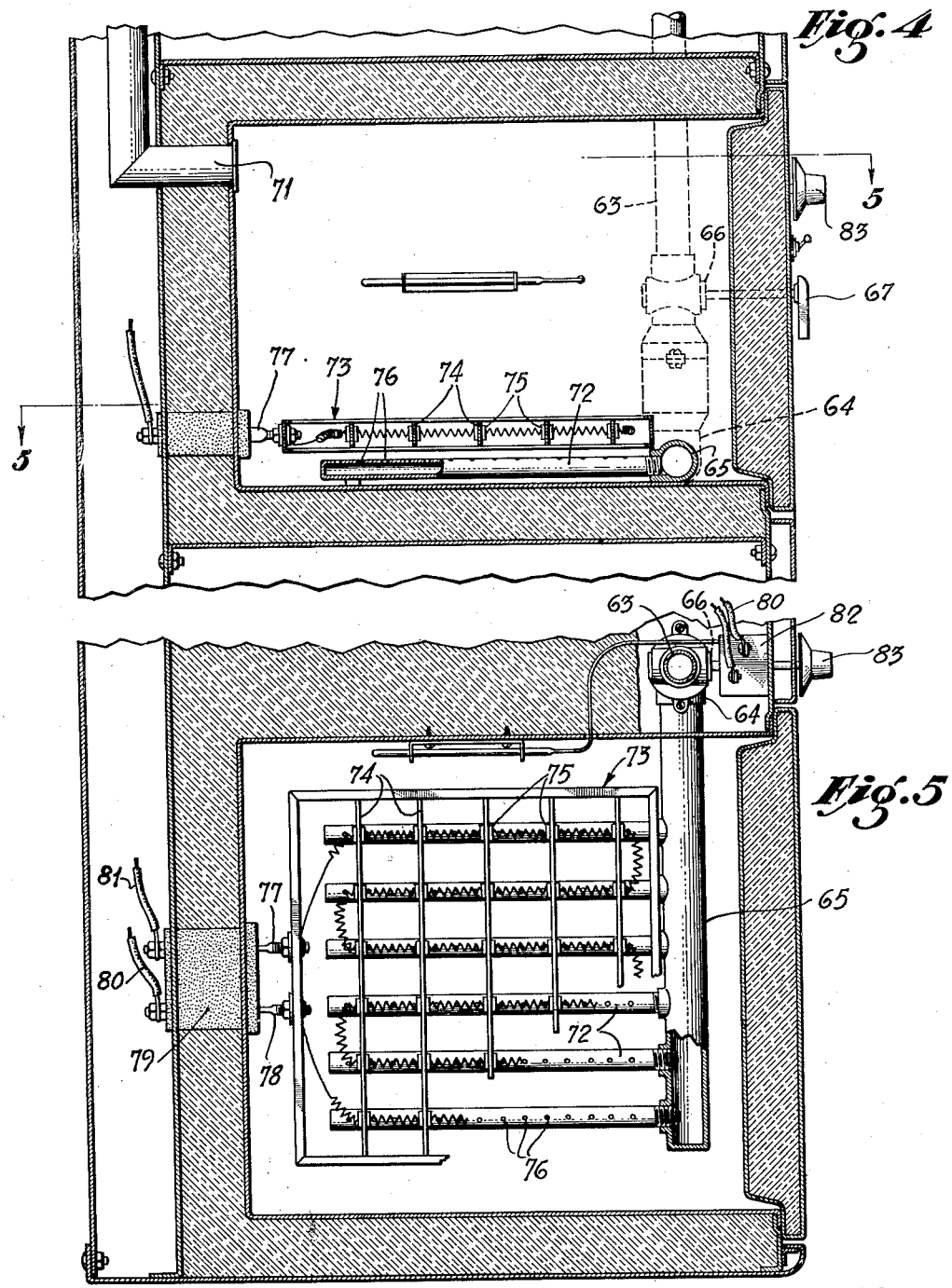

Patented Apr. 29, 1941

2,239,957

UNITED STATES PATENT OFFICE 2,239,957

STOVE

Chujiro Genda, Beverly Hills, Calif.

Application May 7, 1938, Serial No. 206,582

3 Claims. (Cl. 219—37)

This invention relates to improvements in stoves. Specifically, the invention contemplates the obtaining of greater heat in so-called electric stoves.

An object of the invention is to render more efficient stoves of the electric type.

Another object of the invention is the provision of suitable means whereby circulation of air may be maintained about the heating elements of a stove.

Another object is the provision of means whereby air in a heated condition may be directed around the heating elements of a stove in such a manner as to increase the effective heat to be derived from said elements.

Another object is the provision of suitable means for maintaining circulation of heated air in the baking compartment of a stove or range.

I have found that the average electric stove is wasteful of heat, and that my invention will increase the efficiency of the stove to a great extent. Furthermore, the arrangement of my invention is such that, in its incorporation with the burners of a stove or range, various articles may be maintained in a heated condition even after the main burners have been disconnected from a source of current supply. In accomplishing the last named feature of my invention, I have provided suitable means for maintaining a draft of air in a heated condition, independent of the main burners of the stove or range.

Another object of the invention consists in a novel and useful arrangement of means which does not detract from the appearance of a stove or range but actually adds to its appearance.

Other objects include a stove or range adapted to incorporate my improved invention, which is economical in construction, efficient in use and operation, and generally superior to stoves or ranges now on the market so far as the inventor is aware.

With the above mentioned and other objects in view, the invention consists in the novel and useful provision, formation, construction, association and relative arrangement of parts, members and features, all as depicted in certain embodiments in the accompanying drawings, described generally, and more particularly pointed out in the claims.

Figure 3:
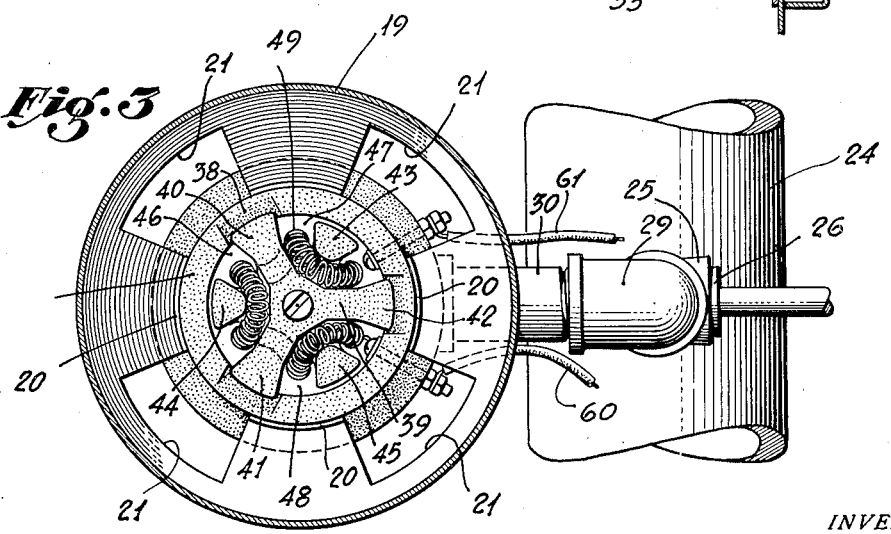

In the drawings:

Figure 1 is a fragmentary perspective view of an improved stove or range of the electric type incorporating my invention, Figure 2 is an enlarged fragmentary sectional view on the line 2—2 of Figure 1, Figure 3 is a fragmentary sectional view on the line 3—3 of Figure 2, Figure 4 is an enlarged fragmentary sectional view on the line 4—4 of Figure 1, Figure 5 is a sectional view on the line 5—5 of Figure 4, Figure 6 is an enlarged fragmentary sectional view on the line 6—6 of Figure 1, and Figure 7 is a diagrammatic wiring diagram incorporated with the invention.

Referring to Figure 1, I designate the improved stove or range as an entirety by the numeral 1, wherein is provided one or more main burners 2, and an oven compartment 3, within which is a burner 4. Ordinarily, the so-called burners 2 and 4 comprise what are known as "Calrod" units, although the burners may be formed of coiled resistant wire having certain properties and of a character well known in the art. It makes little difference to this invention the character of the main resistant wires or units.

As stated in the objects, a feature of the invention is to increase the heat normally given off by the burner or burners. It is obvious that, in the usual stove or range of the electric type, the air about said burner, such as shown at 2, and particularly the heating rods or wires, is heated by conduction. In the present instance, I intend to pass air around the heating elements, which air is to be warmed by conduction if not previously heated, or to pass air around said heating elements, which air has been pre-heated. The inventor is aware that there is now on the market various forms of small room heaters embodying an electric motor having a volume fan placed rearward of electric resistant wire coils, wherein air in the room is caused to be circulated by the fan and passed between the heated coils so as to heat this air by conduction. The present invention, however, differs from these so-called household electric heaters in that air is directed through a conduit past a preheater situated in the path of air through said conduit, and which air, when preheated, is then directed through the burners of the stove, and in this wise the heat elements for the burner portions are adapted to be enclosed rearward of the top surfaces thereof. Furthermore, it is not intended that the heat elements of the burner should be chilled but rather that the velocity of the air past said heat elements should be at a low pressure.

Considering one of the burners 2 and referring to Figure 2, the usual heat resistant porcelain or other ceramic insulating material 5 in the form of a disc or baffle, is formed with a series of circular grooves, or the grooves may form a continuous spiral. Assuming that the groove is the spiral form, as illustrated in Figures 1 and 2 at 6, transverse ports 7 extend from the base 8 of the disc 5 to the trough of the grooves, as shown at 9. Within the spiral grooves is placed the heating element, such as a Calrod 10 or coiled wires. This disc 5 is held by means 11 within an opening in the top 12 of the range. For instance, the top 12 is provided with a depressed flanged portion 14 which bounds the opening 15, within which is received the disc 5, and the means 11 includes an annular member 16 adapted to substantially parallel the surface of the top 12 with an annular portion 17 at substantially right angles to the part 16, and a further portion 18, substantially at right angles to the part 17, which part 18 is annular in form. A conical wall 19 is secured to the part 18 and said wall 19. This wall 19 is frusto-conical in form and has connected thereto a segmental series of flanges 20 with interposed segmental openings 21 in the conical wall 19 (see Figure 3).

It is evident from the description so far given that if any air is to be passed around the heating coils or units 10, that such air must be received within the bowl-like member formed by the conical wall 19, and through the ports 7 which are in direct communication with the groove or grooves 9, within which are received the heating units 10. Thus, direct heat conduction is given to any air passed through said ports 7 by the heating elements 10. It is further evident that the air is directed in a given path about said heating elements, and that the bowl prevents extraneous air currents, and the like, from impinging against said heating elements. All air when flowing or moved under pressure, must pass through the ports 7 in order to contact with the heating units. In this manner, I have provided a type of burner which is efficient in operation and is adapted to give a greater heat than ordinarily obtained where the air is "still" about the top surface of the burner, as is ordinary practice at the present time, so far as the inventor is aware.

The disc 5 is conveniently mounted to the member 18 to form a unitary structure, by providing the disc with one or more transverse bores adapted to register with bores in the flange 18 and through which bores may be passed screws 22 carrying the usual nuts.

Adapted to be secured to a partition wall 23 of the stove is a conduit 24. This conduit carries a valve fitting 25 and a plug valve 26 controls passage through said fitting from said conduit. The plug is conveniently turned by means of a handle 27, there being a shaft between said handle and the plug valve 26. This handle is exterior the front wall 28 of the stove or range. For convenience, it may be stated that the turning of the handle will control the flow of air past said valve. Secured to the valve fitting or housing 25 is an elbow 29 which, in turn, through the medium of a pipe 30, is secured to a member 31. It is intended that the structure just described should be rigid enough to support the member 31, and to assure such rigidity the conduit 24 may be provided with an enlargement 32 which is secured by suitable means 33 to the partition wall 23. The member 31 is cup-like, being provided with a base 32 and a stepped side wall providing two portions of different diameter, as shown at 33 and 34, the step being indicated by 35. Adapted to be fitted within said cup-like member is an insulation sleeve 36 formed of some material such as porcelain, or the like, this insulation sleeve resting upon the step 35. The sleeve is provided with an annular flange 37 and that portion of the member 19 adjacent the interrupted flange 20 rests upon the top surface of said flange 37. The sleeve above the flange 37 extends within the confines of the interrupted or segmental flange 20. The top surface of the sleeve is provided with one or more spaced beveled or inclined segmental wall portions 38 (see Figure 3), and carried by said inclined wall portions and depending within the sleeve is an insulation member 39 of spider-like form. This construction is best illustrated in Figure 3 wherein one spider comprises three equidistantly spaced-apart arms 40, 41 and 42, together with other equidistantly spaced arms interposed between the arms 40 to 42, inclusive, as illustrated at 43, 44, and 45, whereby ways 46, 47 and 48 are provided as between said arms and the inner surface of the sleeve 36. These ways form channels for the passage of air or other gaseous medium. Carried by the arms 43 to 45, inclusive, are heating elements designated generally as 49. To hold the sleeve 36, and insulation member 39, together with the cup-shaped member 34, in position of assemblage, I have provided an elongated bolt 50 passed through an elongated hole in the insulation member 39 and an opening in the base 32 of the member 31. This bolt carries a nut 51 for locking the members in position of service.

In Figure 1, I have illustrated diagrammatically a blower 52 which is in communication with the conduit 24. This blower may be driven by a suitable electric motor and the blower may be of any type desired.

As is customary in electric stoves, the usual switch control 53 carrying a switch handle 54 exterior the front wall of the stove is provided, whereby low, medium and high heat may be obtained from any one burner. Wire connections 55, 56 and 57 are shown between the heating elements 10 and the switch box 53. A switch box 58 controlled by a toggle type switch 59 is in connection through the medium of wires 60 and 61 with the coils 49 of the air preheater. The toggle lever is, of course, placed in the front face of the stove so that it can be readily operated.

I have described so far a single burner and its associated elements. All burners appearing on the top of the stove, shown in Figure 1, are constructed and adapted for operation in the same manner as the description just given.

The oven compartment is arranged in a slightly different manner, although the principle of conducting air to the heating elements remains substantially the same as that described for the top burners. It will be observed upon reference to Figure 1 that the conduit 24 has a T-connection at 62, and a further conduit 63 secured to said T, through an elbow 64 with a conduit 65. Interposed within the conduit 63 is a plug valve 66 controlled as to movement by a handle or lever 67 exterior the front surface of the stove, as for instance illustrated at 68 in Figure 1. This valve housing or fitting has an enlarged portion adapted to confine a heating element 69 of a construction similar to that shown for the so-called air preheater of Figures 2 and 3, that is to say, a tubular insulation member 70, which would correspond to the sleeve member 36, houses therein members similar to that designated as 39—43, which in turn carries the heating coils 49. This heating element is immediately above the elbow 64, as shown in Figure 1. The conduit 65 carries a plurality of spaced substantially parallel transverse pipes 72. Arranged immediately above these pipes 72 is a grill designated generally by 73, the grill including a rectangular framing provided with transverse spaced partition members 74 arranged at substantially right angles to the pipes or tubes 72. The partition members carry insulation sleeves designated generally as 75 and coiled heating wire is passed through the sleeves in such a manner that the main length of each coiled heating wire will overlie, in substantial parallelism a pipe 72. Each pipe 72 is provided with one or more ports 76 communicating with the interior of the pipes and arranged directly below each length of heating coil. Ends of the heating coil communicate with bus rods 77 and 78, which in turn pass through an insulation block 79 whereby electric wires 80 and 81 secured to the bus rods may lead to a suitable switch box 82 and a source of current supply. The switch box carries a regulator 83 of the rotary type to control the amount of electricity flowing to the coils to thereby regulate heat in the oven.

The operation, uses and advantages of the invention just described are as follows:

When it is desired to use one of the burners 2, the switch 54 may be turned to any one of several positions, such as low, medium, and high heat, and the burner will then operate in the usual manner. It is customary where Calrod units are used, to expose the surface of the Calrod and to allow the kitchen utensil to rest thereon. This construction can be resorted to in that the Calrods may rest upon the surface of the disc in place of being received within spiral grooves in said disc, as illustrated in Figure 2. In any event, the ducts or ports 7 are positioned directly beneath the Calrods so that any air passed through the ducts or ports will impinge upon the Calrods so that the air may be heated by conduction. If wire coils are used, then it is customary to provide the coils within the grooves, as shown in Figure 2, the coils not supporting the weight of any kitchen utensil. Nevertheless, the ducts or ports 7 in each instance are directly beneath the coils and the air directed through said ports or ducts will impinge against and between the coils, the air being heated by conduction. The arrows above the burner, shown in Figure 2, indicate the path of air flow. The blower 52 may be operating which will force air through the conduit or pipe 24, and the volume of air to be passed through the ducts 7 is regulated by plug valve 26 through the simple expedient of turning the valve through the medium of the handle 27 projecting beyond the front face of the stove or range. It may not be desired to preheat the air prior to its passage through the ducts 7. However, if it is desired to preheat the air, the toggle switch 59 may be moved so that the coils 49 become hot and the air in its passage through the ways 46, 47 and 48 will be heated by these coils and heated air directed through the ports 7 past the heating elements 10. If it is desired that a plate, kitchen utensil, or the like, be maintain in a heated condition, the switch 54 may be turned to an "off" position, the switch 59 remaining "on", to the end that heated air will be directed through the ports 7 for impingement upon the plate or other utensil. The segmental openings 21 in the conical wall 19 permit passage of air within the member 19 and rearward of the disc without such air being under pressure or preheated. Obviously, the passage of heated air past the preheater will cause, to a certain degree, colder air to enter through the openings 21 and upwardly through the ducts 7. In other words, air would be drawn through the openings 21 through the ducts 7 when the heating elements 10 are heated by the passage of electricity therethrough, and irrespective of whether or not the handle 27 is turned to an "off" or "on" position.

In the use of the broiler or oven, the compartment is normally closed and is not directly affected by extraneous air currents above the burner as is the case for the top burners shown at 2. Therefore, the heating elements being the coiled wires carried by the grill, are directly positioned above the ducts or ports in the air conveying pipes 72 so that air directly impinges upon and around said heating coils. This air may be preheated prior to passage through the ducts or be at normal temperature, dependent upon the positioning of the valve handle 68.

The wiring diagram shown in Figure 7 is conventional and will not be described, as a mere inspection thereof renders the same self-evident as to its operation.

In order to support the grill, I may provide supports, and I may likewise provide within the oven a vent pipe, whereby vapors and excess heat may be removed. This pipe is shown at 71.

When the main heating elements of the broiler or oven are turned off or inoperative, it is evident that I may direct heated air into said broiler or oven by maintaining the preheater for air entering the broiler or oven in operation.

It is obvious that various changes and modifications and variations may be made in practicing the invention in departure from the particular showing of the drawings and the description as given without, however, departing from the true spirit of the invention or the scope of the appended claims.

I claim:

1. In electric range construction, an insulation disc provided with transverse ducts, an electric heating element positioned on one side of said disc and directly over said transverse ducts, a casing secured to the disc on the side opposite said electric heating element, a preheater secured to said casing, said preheater comprising an electric heating element, and means for conveying air through said preheater thence through the ducts in the disc for impingement upon the first named electric heating element.

2. In an electric range construction, an insulation disc provided with a spiral groove and with transverse ducts communicating with said groove, an electric heating element received within said spiral groove and positioned directly over the transverse ducts, and means for conducting air under pressure through said ducts into the said spiral groove for direct impingement upon the electric heating element within said groove.

3. In electric range construction, an insulation disc provided with transverse ducts, an electric heating element positioned on one side of said disc and directly over said transverse ducts, a conical casing secured to the disc on the side opposite said electric heating element, a preheater secured to said casing at the apex thereof, and means for conveying air through said preheater into said casing, through the ducts in the disc for direct impingement upon the electric heating element.

CHUJIRO GENDA.